United States Patent [19]
Pfefferle et al.

[11] Patent Number: 5,531,066
[45] Date of Patent: Jul. 2, 1996

[54] FUEL INJECTOR AND IGNITER ASSEMBLY

[75] Inventors: William C. Pfefferle, Middletown, N.J.; E. Jack Sweet, Trumbell, Conn.

[73] Assignee: Precision Combustion, Inc., New Haven, Conn.

[21] Appl. No.: 516,964

[22] Filed: Aug. 18, 1995

Related U.S. Application Data

[63] Continuation of Ser. No. 227,596, Apr. 14, 1994, abandoned.

[51] Int. Cl.$^6$ ................................................ F02C 7/264
[52] U.S. Cl. ................................. 60/39.822; 431/268
[58] Field of Search ........................ 60/39.821, 39.822, 60/39.826, 39.06, 723; 431/6, 268

[56] References Cited

U.S. PATENT DOCUMENTS

| | | | |
|---|---|---|---|
| 3,577,731 | 5/1971 | Bruchez, Jr. ........................ | 60/39.822 |
| 4,065,917 | 1/1978 | Pfefferle ............................... | 431/6 |
| 4,439,980 | 4/1984 | Biblarz et al. ...................... | 60/39.06 |
| 4,455,822 | 6/1984 | Bayle-Laboute et al. ........... | 60/723 |
| 4,741,879 | 5/1988 | McLean et al. .................... | 376/301 |
| 4,825,658 | 5/1989 | Beebe ................................... | 431/268 |

FOREIGN PATENT DOCUMENTS

| | | | |
|---|---|---|---|
| 612060 | 11/1948 | United Kingdom ................ | 60/39.822 |
| 948578 | 2/1964 | United Kingdom ................ | 60/39.822 |

OTHER PUBLICATIONS

Lefebvre, Arthur H. *Gas Turbine Combustion*. New York, N.Y.: McGraw–Hill, 1983. pp. 454, 455.

*Primary Examiner*—Timothy S. Thorpe
*Attorney, Agent, or Firm*—Kane, Dalsimer, Sullivan, Kurucz, Levy, Eisele and Richard

[57] ABSTRACT

An assembly for the catalytic ignition of atomized fuel for combustion within the combustion chamber of a turbine engine places the catalytic fuel igniter in a position to receive the atomized fuel upon entry into the combustion chamber. The igniter is heated to operating temperature so that at least a portion of the atomized fuel enters the combustion chamber in an ignited state.

9 Claims, 2 Drawing Sheets

FUEL INJECTOR AND IGNITER ASSEMBLY

This invention was made with government support under F33615-92-C-2243 and DAAL03-91-C-0037 awarded by the United States Air Force and the United States Army Research Office respectively. The U.S. government has certain rights in this invention.

BACKGROUND OF THE INVENTION

This application is a continuation, of application Ser. No. 08/227,596, filed Apr. 14, 1994, now abandoned.

FIELD OF THE INVENTION

The invention relates to a fuel injector catalytic igniter assembly for use with a combustor of the gas turbine engine.

BRIEF DESCRIPTION OF RELATED ART

Commercial aircraft gas turbine combustors utilize combustor wall mounted igniters, typically a spark plug, for combustor light-off. This requires the presence of fuel close to the wall. Inasmuch as combustion of fuel near the wall during full power operation tends to raise the wall temperature, combustor designs tend to be a compromise between ignition and operational requirements. Thus there have been numerous attempts to achieve ignition away from the wall. Ideally, ignition should be achieved right at the fuel source so that ignition of the initial fuel flow is possible. This avoids the necessity to dump unburned fuel into the combustor prior to ignition (creating the potential for hot starts or explosive detonations with consequent damage to the turbine) and enables the use of spray patterns which keep fuel away from the combustor walls.

Accordingly, there has been interest in integrating the ignition source into the fuel injector. For example, U.S. Pat. No. 4,938,019 describes a fuel nozzle with an integrated spark plug igniter assembly and U.S. Pat. No. 4,825,658 describes a fuel nozzle with a catalytic glow plug igniter assembly. Such designs have major drawbacks which limit utility. For example, a spark plug integrated into an injector is subject to fouling if wetted by liquid turbine fuel, rendering it inoperative. In addition, size limitations reduce spark plug life. On the other hand, although the glow plug of U.S. Pat. No. 4,825,658 eliminates the fouling problem of spark plugs, the glow plug is designed such that the return flow of the recirculating flow downstream of the injector contacts the hot glow plug surface resulting in ignition of the downstream recirculating gases. Inasmuch as the initial direction of the incoming fuel-air flow from the swirler is away from the glow plug considerable fuel can travel downstream before sufficient fuel is injected to increase the recirculation zone fuel concentration high enough at the glow plug to allow ignition. Thus explosive detonation is possible as is the case with conventional spark igniters presently used in aircraft gas turbine engines. Advantageously, fuel should be ignited immediately as it enters the combustor.

Injectors for injection of fuel into combustors for gas turbine engines are typically either of the air blast type or pressure atomizers. Both types have advantages and disadvantages. The former requires little pumping power but gives poor atomization at low air flows. Pressure atomizers are simpler but have a high power requirement and with some fuels are subject to plugging. A typical air blast nozzle for atomization of fuel for use in the combustor of a gas turbine engine is described in U.S. Pat. No. 3,684,186 issued Aug. 15, 1972 and incorporated herein by reference thereto.

Air blast fuel nozzles utilize compressor discharge air to provide atomization of fuel and mixing of fuel and air discharged from the nozzle whereas pressure atomizers use a high pressure to force flow through a small orifice at a high velocity with fuel droplet formation on contact with the combustion air.

SUMMARY OF THE INVENTION

In the present invention atomized fuel entering a gas turbine combustor is ignited as it enters the combustor by contact with a hot surface igniter. Advantageously, the igniter surfaces are catalytic for oxidation of fuel so that the igniter remains at a temperature high enough for continuous ignition of entering fuel without the need for electrical power, thus providing assurance against combustor flameout. For combustor light-off, the igniter may be heated electrically by passage of a current or by such means as a laser beam or inductive heating. Although a smooth surface igniter may be used, it has been found that igniters with flow through channels, as for example slots, are advantageous particularly at higher air flow velocities in an air blast fuel injector. In the present invention, fuel may be injected and atomized with any of a variety of fuel injectors including for example air blast atomizers, pressure atomizers, and high shear atomizers.

In operation of an igniter/injector of the present invention, fuel is atomized and mixed with air and passed into a combustion chamber. At least a portion of the entering fuel contacts a hot ignition catalyst surface, thus providing continuous catalytic ignition of entering fuel. Such continuous ignition allows operation of the combustor much closer to its lean limit than would otherwise be prudent because of the danger of a flameout. With electrical preheating of the catalyst prior to initial introduction of fuel, even combustor light-off can be achieved at the combustor lean limit.

DETAILED DESCRIPTION OF THE PREFERRED EMBODIMENTS OF THE INVENTION

Figure 1:
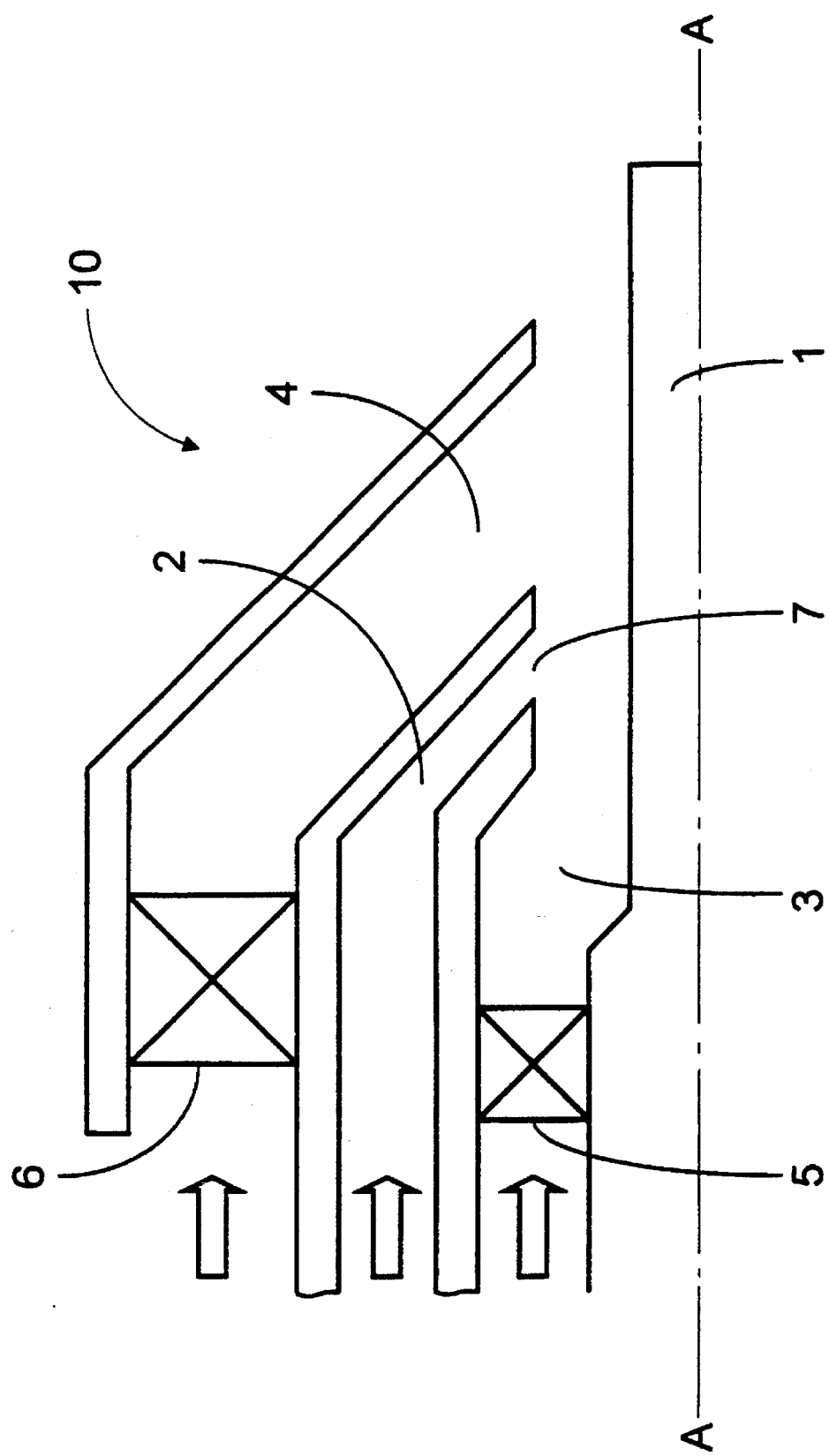
FIG. 1 is a schematic cross-sectional view of a preferred embodiment assembly of the invention.

As shown in the drawing of FIG. 1, assembly 10 has an electrically heated igniter 1 placed in the center of axial line A—A of a conventional air blast fuel atomizing nozzle having concentric fuel passage 2 placed between concentric air flow passages 3 and 4, replacing the start-up pressure atomizer otherwise in this location. Swirlers 5 and 6 in air passages 3 and 4 respectively provide swirl to the air flowing through passages 3 and 4 thus generating the shear forces necessary to atomize and mix with fuel exiting fuel passage 2 through nozzle tip 7. In operation, atomized fuel is brought into contact with the hot surface of igniter 1 by air flowing through passages 3 and 4 resulting in ignition of fuel during passage into the combustion chamber. During starting of a gas turbine engine, typically the igniter is heated to a temperature above the minimum temperature required for ignition at the given air flow condition prior to introduction of fuel thus assuring a rapid light-off. After light-off, electrical power to the igniter may be controlled to maintain the igniter temperature below a safe value for the materials used. Typically, electrical heating is discontinued after light-off though continued controlled heating may be utilized to provide near instantaneous relight in those situations where aircraft operation for example could result in engine flameout such as by ingestion of water into the engine. Although this invention has been described in terms of an air blast fuel nozzle, gas turbine fuel nozzles such as pressure atomizers or high shear nozzles can be utilized in the present invention.

Catalytic igniters of the present invention may employ any ignition catalyst known in the art which is reactive for the fuels to be used. Platinum containing catalysts, however, are preferred because of their high activity with a wide variety of fuels and resistance to the effects of sulfur in the fuel. The temperature of the igniter element may be monitored and controlled using temperature sensing devices such as resistive elements, thermocouples, infrared detectors and laser beam sensors.

EXAMPLE

Figure 2:
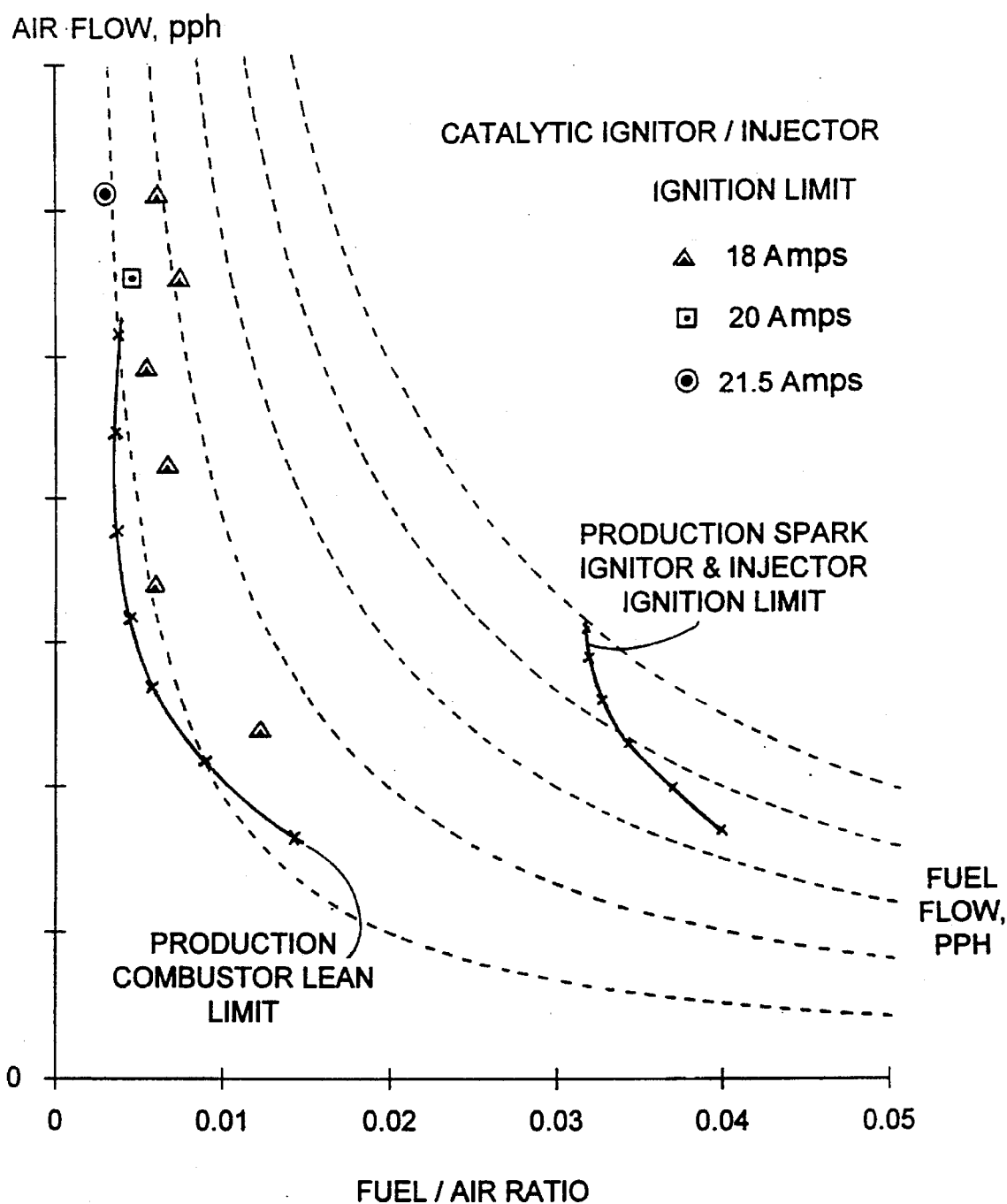
FIG. 2 is a graphical representation of the improvement in combustion limits demonstrated in tests.

Using an engineering development laboratory combustor test rig, an air-blast fuel nozzle with a catalytic igniter in place of the bill of material start up center line pressure atomizer was mounted in the dome and liner assembly of an AGT 1500 gas turbine. For ignition testing, air flow was first established, next electrical power was applied to the catalytic igniter, and finally fuel flow was established. Full combustion was achieved in less than $1/15$ of a second with initial flame propagation within $1/30$ of a second of fuel flow. Ignition was not only achieved at normal lean limit fuel flow for the bill of material-spark ignition system but also at the lower combustor lean limit. The test results are shown FIG. 2. A graphical representation showing the improved ignition limits of the assembly of the invention compared to the bill of material (production configuration).

We claim:

1. A fuel injector and ignition catalyst assembly for the catalytic ignition of droplets of atomized liquid fuel for combustion within a combustion chamber, which comprises;

means for atomizing liquid fuel and forming droplets of the atomized fuel within the assembly;

a catalytic fuel igniter for igniting the fuel droplets, for mounting in open communication with said combustion chamber;

means for electrically heating said igniter to a temperature for ignition of the fuel droplets; and means for passing atomized fuel droplets into said chamber such that at least a portion of said atomized fuel droplets contacts said igniter and are ignited as they enter said combustion chamber.

2. The assembly of claim 1 incorporating an air blast fuel nozzle.

3. The assembly of claim 1 incorporating a pressure atomizer.

4. The assembly of claim 1 incorporating sensor means to measure the temperature of said igniter.

5. The assembly of claim 4 wherein said sensor means comprises an infra-red detector.

6. The assembly of claim 4 wherein said sensor means comprises a thermocouple.

7. The assembly of claim 1 wherein said igniter comprises a platinum metal catalyst.

8. The assembly of claim 2 wherein said igniter is mounted coaxially within the fuel nozzle.

9. In a gas turbine engine, which comprises; a fuel combustion chamber; a catalytic fuel igniter mounted in communication with the combustion chamber; a reservoir of fuel; and means for injecting the fuel into the combustion chamber; the improvement, which comprises;

a fuel injector and ignition catalyst assembly for the catalytic ignition of droplets of atomized liquid fuel for combustion within the combustion chamber, positioned in open communication with the combustion chamber, said assembly comprising;

means for atomizing liquid fuel and forming droplets of the atomized fuel within the assembly;

a catalytic fuel igniter for igniting the fuel droplets;

means for electrically heating said igniter to a temperature for ignition of the fuel droplets; and means for passing atomized fuel droplets into said chamber such that at least a portion of said atomized fuel droplets contacts said igniter and are ignited as they enter said combustion chamber;

whereby ignited fuel droplets enter the combustion chamber.

* * * * *